(12) United States Patent
Ma

(10) Patent No.: US 10,880,424 B2
(45) Date of Patent: Dec. 29, 2020

(54) RECORDING METHOD FOR MOBILE TERMINAL AND MOBILE TERMINAL

(71) Applicant: VIVO MOBILE COMMUNICATION CO., LTD., Chang'an Dongguan (CN)

(72) Inventor: Junjie Ma, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/487,015

(22) PCT Filed: Dec. 29, 2017

(86) PCT No.: PCT/CN2017/119913
§ 371 (c)(1),
(2) Date: Aug. 19, 2019

(87) PCT Pub. No.: WO2018/149241
PCT Pub. Date: Aug. 23, 2018

(65) Prior Publication Data
US 2020/0236206 A1   Jul. 23, 2020

(30) Foreign Application Priority Data
Feb. 20, 2017   (CN) .......................... 2017 1 0090582

(51) Int. Cl.
*H04M 1/656* (2006.01)
*H04M 1/725* (2006.01)
*H04M 3/42* (2006.01)

(52) U.S. Cl.
CPC ......... *H04M 1/656* (2013.01); *H04M 1/7255* (2013.01); *H04M 3/42221* (2013.01)

(58) Field of Classification Search
CPC ............. H04M 3/42221; H04M 1/656; H04M 1/72519; H04M 1/72572; H04M 3/2281;
(Continued)

(56) References Cited

U.S. PATENT DOCUMENTS 5,144,649 A * 9/1992 Zicker .................... G06Q 20/32
379/114.19
5,337,350 A * 8/1994 Kuwahara .......... H04N 1/32704
358/400

(Continued)

FOREIGN PATENT DOCUMENTS

CN        101277332 A        10/2008
CN        102231771 A        11/2011
(Continued)

OTHER PUBLICATIONS

1st Chinese Office Action for Chinese Application No. 201710090582. 0, dated Apr. 16, 2018 (dated Apr. 16, 2018)—6 pages (English translation—3 pages).
(Continued)

*Primary Examiner* — Jean A Gelin
(74) *Attorney, Agent, or Firm* — Culhane Meadows PLLC; Stephen J. Weed

(57) ABSTRACT

The present disclosure provides a recording method for mobile terminal and a mobile terminal. The method includes: when the mobile terminal is in a call with a contact, obtaining information of the contact in the current call with the mobile terminal; determining whether the information of the contact in the current call is found in an automatic recording list preset in the mobile terminal; and activating call recording when the information of the contact in the current call is found in the automatic recording list in the mobile terminal.

13 Claims, 5 Drawing Sheets

(58) Field of Classification Search
CPC ........... H04W 4/50; H04W 8/18; H04W 4/16; H04W 12/06; H04W 12/0602; H04W 12/0605; H04W 12/0608; H04W 12/08; H04W 12/10
See application file for complete search history.

(56) References Cited

U.S. PATENT DOCUMENTS

| | | | |
|---|---|---|---|
| 6,430,270 B1 * | 8/2002 | Cannon | H04M 1/656 379/142.04 |
| 2007/0211876 A1 | 9/2007 | Othmer et al. | |
| 2013/0095791 A1 * | 4/2013 | Bennett | H04M 3/2281 455/411 |
| 2014/0302823 A1 | 10/2014 | Wang et al. | |
| 2016/0112475 A1 * | 4/2016 | Lawson | H04L 67/02 709/204 |
| 2016/0286044 A1 | 9/2016 | Wang et al. | |
| 2019/0222685 A1 * | 7/2019 | Mclean, Jr. | H04W 4/50 |

FOREIGN PATENT DOCUMENTS

| | | |
|---|---|---|
| CN | 104394262 A | 3/2015 |
| CN | 105847520 A | 8/2016 |
| CN | 106713592 A | 5/2017 |
| WO | 2007057751 A2 | 5/2007 |

OTHER PUBLICATIONS

Extended European Search Report for European Application No. 17896356.7, dated Nov. 11, 2019 (dated Nov. 11, 2019)—8 pages.
International Search Report and Written Opinion for International Application No. PCT/CN2017/119913, dated Aug. 29, 2019 (dated Aug. 29, 2019)—9 pages (English translation—6 pages).

* cited by examiner

RECORDING METHOD FOR MOBILE TERMINAL AND MOBILE TERMINAL

CROSS-REFERENCE TO RELATED APPLICATION

This application is the U.S. national phase of PCT Application No. PCT/CN2017/119913 filed on Dec. 29, 2017, which claims a priority to Chinese Patent Application No. 201710090582.0 filed with the Chinese Patent Office on Feb. 20, 2017, the entire disclosure of which is incorporated herein by reference.

TECHNICAL FIELD

The present disclosure relates to the field of communication technologies, and in particular to a recording method for mobile terminal and a mobile terminal.

BACKGROUND

With development of mobile communication technologies, mobile terminals such as mobile phones and tablet computers are more and more popular. The mobile terminals have become an indispensable part of people's daily life. People have higher and higher requirements for the experience of using the mobile terminals, especially in the process of using the mobile terminals to make calls. The mobile terminal usually has a recording function, which can record the calls between a mobile terminal user and a contact, so that the mobile terminal user can listen to the call with the contact again, which plays an important role in improving the experience of the mobile terminal user during the call.

At present, in the process that the mobile terminal user is in a conversation with the contact, when recording is required, the mobile terminal user usually needs to manually activate the recording function of the mobile terminal, thereby realizing recording of the call process. However, the mobile terminal user needs to perform operations every time recording, which is cumbersome and time-consuming. Therefore, the cumbersome and time-consuming operation of the mobile terminal during the recording process becomes a technical problem to be solved urgently.

SUMMARY

Embodiments of the present disclosure provide a recording method for mobile terminal and a mobile terminal, which can solve the problem of cumbersome and time-consuming operations of the current mobile terminal in the recording process during a call.

According to a first aspect, one embodiment of the present disclosure provides a recording method for a mobile terminal, which is applied to mobile terminal, the method includes: when the mobile terminal is in a call with a contact, obtaining information of the contact in the current call with the mobile terminal; determining whether the information of the contact in the current call is found in an automatic recording list preset in the mobile terminal; and activating call recording when the information of the contact in the current call is found in the automatic recording list in the mobile terminal.

According to a second aspect, one embodiment of the present disclosure provides a mobile terminal that includes:
an information acquisition module configured to, when the mobile terminal is in a call with a contact, obtain information of the contact in the current call with the mobile terminal;
a first determination module configured to, determine whether the information of the contact in the current call is found in an automatic recording list preset in the mobile terminal; and
a recording-enabled module configured to activate call recording when the information of the contact in the current call is found in the automatic recording list in the mobile terminal.

According to a third aspect, one embodiment of the present disclosure provides a mobile terminal that includes: a storage, a processor and a computer program stored in the storage and executable on the processor. The processor executes the computer program to implement steps of the above method.

In this way, in some embodiments of the present disclosure, when the mobile terminal is in a call with the contact, the mobile terminal obtains information of the contact in the current call with the mobile terminal, determines whether the information of the contact in the current call is found in the automatic recording list preset in the mobile terminal. The mobile terminal activates call recording when the information of the contact in the current call is found in the automatic recording list in the mobile terminal. In this way, when the mobile terminal makes a call with the contact in the preset automatic recording list, the mobile terminal can automatically activate the call recording, which is convenient and time-saving.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of embodiments of the present disclosure will be described hereinafter in a clear and complete manner in conjunction with the drawings of the embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
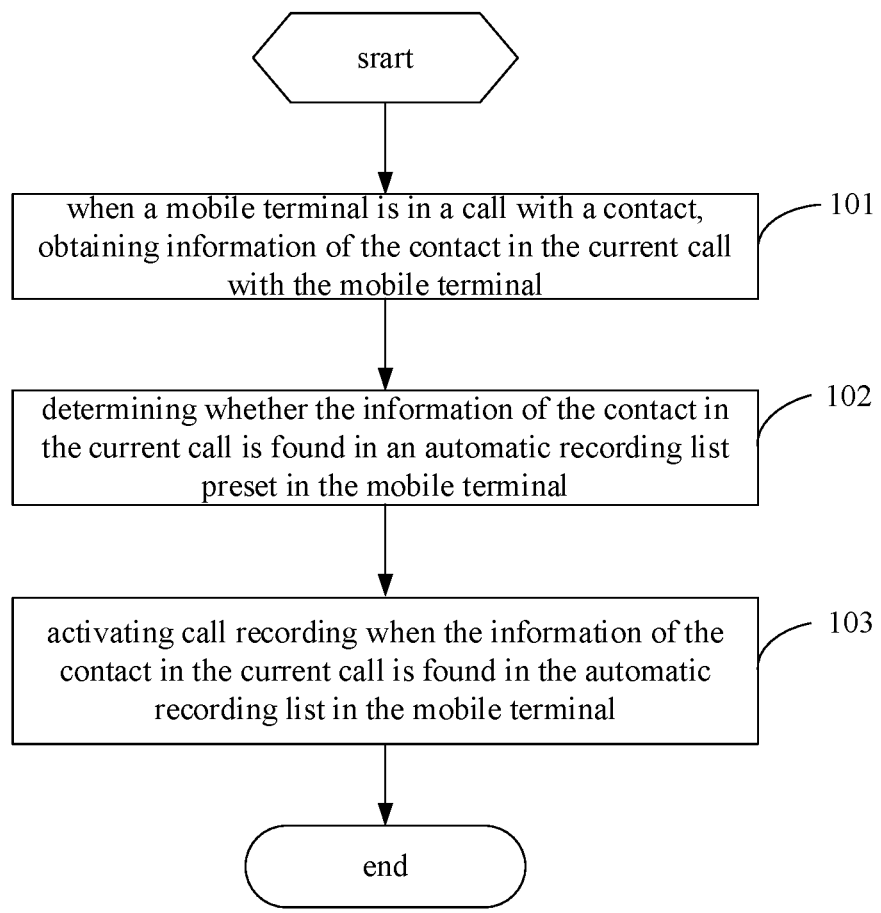
FIG. 1 is a flow chart of a recording method for mobile terminals according to an embodiment of the present disclosure.

Referring to FIG. 1, FIG. 1 is a flow chart of a recording method for mobile terminals according to an embodiment of the present disclosure. As shown in FIG. 1, the method includes the following steps.

The step 101 is to, when a mobile terminal is in a call with a contact, obtain information of the contact in the current call with the mobile terminal.

In some embodiments of the present disclosure, when the mobile terminal establishes a call in response to a call request or is in a conversation with the contact, the mobile terminal can obtain the information of the contact in the current call with the mobile terminal. The above information of the contact may include a contact name and a phone number of the contact, etc. Of course, the above contact does not refer to a real "person", but refers to a terminal that can make a call with the mobile terminal, which may be a mobile terminal or a fixed telephone device.

In addition, the above calls may be video or voice calls through any one of circuit switched (CS), voice over internet protocol (VOIP), voice over LTE (VoLTE), video over LTE (ViLTE) and internet telephone. The above calls may be either voice calls in the form of telephone calls or video or voice calls in the form of instant messaging applications, which are not limited here.

The step 102 is to determine whether the information of the contact in the current call is found in an automatic recording list preset in the mobile terminal.

In some embodiments of the present disclosure, when the information of the contact in the current call is obtained, the mobile terminal may search the preset automatic recording list according to the information of the contact in the current call, and determine whether the information of the contact in the current call is found in the automatic recording list. Information of at least one contact is added to the preset automatic recording list.

For example, according to an obtained phone number of the contact in the current call, the mobile terminal searches for the phone number of the contact in the current call in the automatic recording list. When the phone number of the contact in the current call is added to the automatic recording list, the phone number of the contact in the current call can be found in the automatic recording list. When the phone number of the contact in the current call is not added to the automatic recording list, the phone number of the contact in the current call cannot be found in the automatic recording list.

The step 103 is to activate call recording when the information of the contact in the current call is found in the automatic recording list in the mobile terminal.

In some embodiments of the present disclosure, in the above step 102, when the information of the contact in the current call is found in the automatic recording list in the mobile terminal, it indicates that when the mobile terminal makes a call with the contact, it needs to record the call process. Then, the mobile terminal automatically turns on a recording module and records the call of the contact in the current call.

In some embodiments of the present disclosure, the above mobile terminal may be any mobile terminal that performs call recording, such as a mobile phone, a tablet personal computer, a laptop computer, a personal digital assistant (PDA), and a mobile internet device (MID) or a wearable device, etc.

In this way, in some embodiments of the present disclosure, when the mobile terminal is in a call with the contact, the mobile terminal obtains information of the contact in the current call with the mobile terminal, determines whether the information of the contact in the current call is found in the automatic recording list preset in the mobile terminal. The mobile terminal activates call recording when the information of the contact in the current call is found in the automatic recording list in the mobile terminal. In this way, when the mobile terminal makes a call with the contact in the preset automatic recording list, the mobile terminal can automatically activate the call recording, which is convenient and time-saving.

Figure 2:
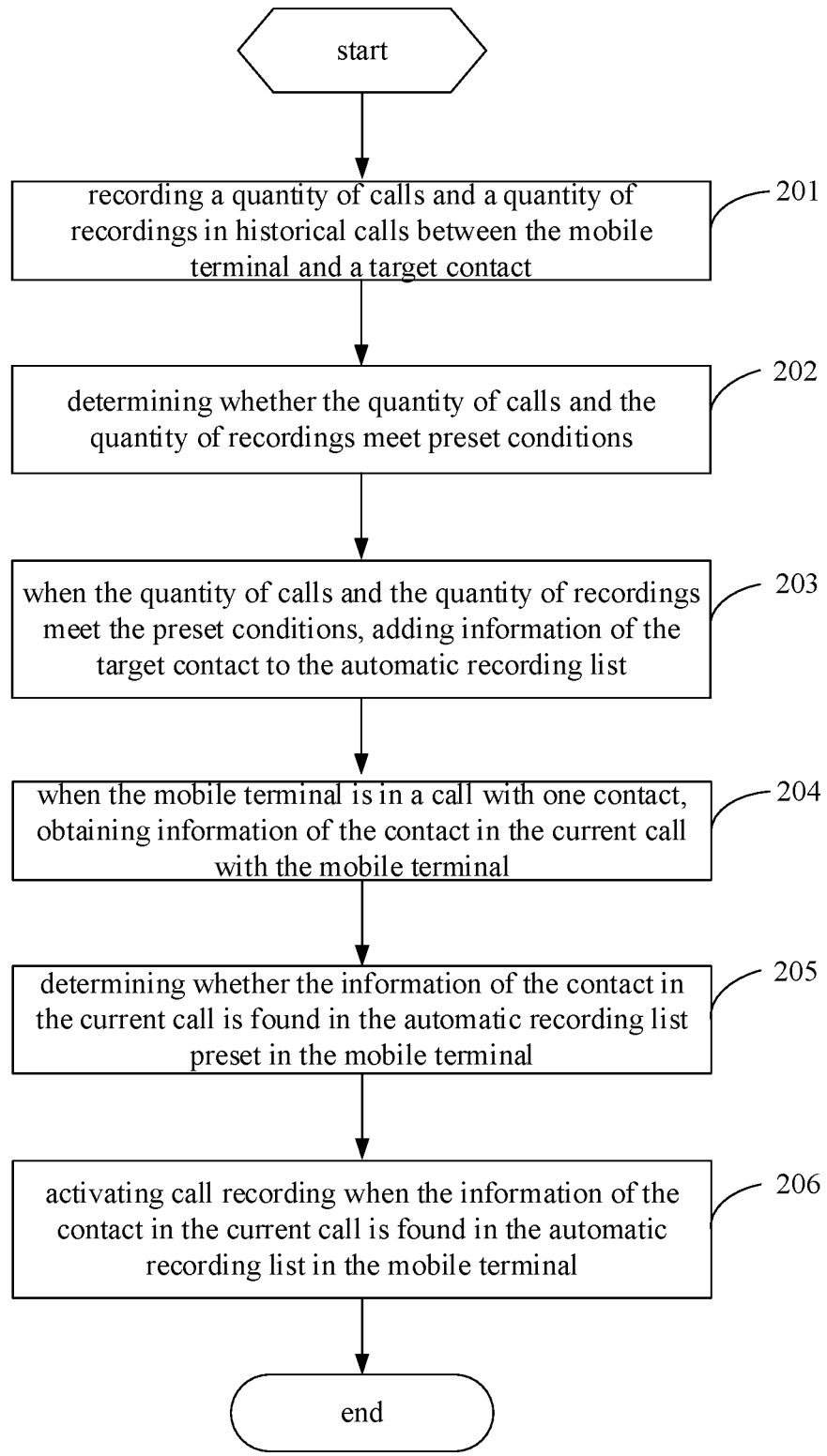
FIG. 2 is a flow chart of another recording method for mobile terminals according to an embodiment of the present disclosure.

Referring to FIG. 2, FIG. 2 is a flow chart of another recording method for mobile terminals according to an embodiment of the present disclosure. As shown in FIG. 2, the method includes the following steps.

The step 201 is to record a quantity of calls and a quantity of recordings in historical calls between the mobile terminal and a target contact.

In some embodiments of the present disclosure, when the mobile terminal makes a call with the target contact, the mobile terminal can record the quantity of calls and the quantity of recordings in the historical calls between the mobile terminal and the target contact depending on whether the call recording is activated during the calls. The above target contact may be any contact that makes a call with the mobile terminal.

Optionally, the above step of recording the quantity of calls and the quantity of recordings in the historical calls between the mobile terminal and the target contact may include:

when it is detected that the mobile terminal makes a call with the target contact and the mobile terminal is set to activate the call recording during a call, increasing each of an existing quantity of calls and an existing quantity of recordings for the target contact in the mobile terminal by one; and when it is detected that the mobile terminal makes a call with the target contact and the mobile terminal is set to not activate the call recording during a call and an existing quantity of recordings is greater than zero, increasing an existing quantity of calls for the target contact in the mobile terminal by one.

For example, when the mobile terminal detects that it makes a call with the target contact, the mobile terminal may detect whether the call recording is activated during the call. It is assumed that in the historical calls between the mobile terminal and the target contact recorded before the current moment, an existing quantity of calls is 4 and an existing quantity of recordings is 2. When the call recording has been activated, the mobile terminal can update the quantity of calls in the historical calls between the mobile terminal and the target contact to be 5 while keeping the quantity of recordings to be 2, thereby intuitively reflecting recording situations when the mobile terminal makes a call with the target contact.

In addition, when it is detected that the mobile terminal makes a call with the target contact and the mobile terminal is set to not activate the call recording during a call and an existing quantity of recordings is equal to zero, the mobile terminal may not record the quantity of calls and the quantity of recordings for calls between the mobile terminal and the target contact, thereby saving resources of the mobile terminal.

The step 202 is to determine whether the quantity of calls and the quantity of recordings meet preset conditions.

In some embodiments of the present disclosure, based on the quantity of calls and the quantity of recordings in the historical calls between the mobile terminal and the target contact recorded in the above step 201, the mobile terminal may determine whether the quantity of calls and the quantity of recordings meet preset conditions.

Optionally, the above step of determining whether the quantity of calls and the quantity of recordings meet preset conditions, may include: when the quantity of calls reaches a first preset threshold, determining whether the quantity of recordings is greater than or equal to a second preset threshold; when the quantity of recordings is greater than or equal to the second preset threshold, determining that the quantity of calls and the quantity of recordings meet preset conditions.

For example, the first preset threshold is set in advance to be 5, and the second preset threshold is set in advance to be 3; then in the historical calls between the mobile terminal and the target contact recorded in the above step 201, when the quantity of calls reaches 5 and the quantity of recordings reaches 3, the mobile terminal can determine that the quantity of calls and the quantity of recordings meet preset conditions. When the quantity of calls reaches 5 and the quantity of recordings is just 2, the mobile terminal can determine that the quantity of calls and the quantity of recordings do not meet the preset conditions.

Optionally, the above step of determining whether the quantity of calls and the quantity of recordings meet preset conditions includes: when the quantity of calls reaches a third preset threshold, determining whether a ratio of the quantity of recordings to the quantity of calls is greater than or equal to a fourth preset threshold, determining that the quantity of calls and the quantity of recordings meet the preset conditions when the ratio of the quantity of recordings to the quantity of calls is greater than or equal to the fourth preset threshold.

For example, the third preset threshold is set in advance to be 5, and the fourth preset threshold is set in advance to be 0.6; then in the historical calls between the mobile terminal and the target contact recorded in the above step 201, when the quantity of calls reaches 5 and the quantity of recordings reaches 3, the ratio of the quantity of recordings to the quantity of calls is 0.6, then the mobile terminal can determine that the quantity of calls and the quantity of recordings meet the preset conditions. When the quantity of calls reaches 5 and the quantity of recordings is just 2, the ratio of the quantity of recordings to the quantity of calls is less than 0.6, then the mobile terminal can determine that the quantity of calls and the quantity of recordings do not meet the preset conditions.

Of course, the above preset conditions may also be a difference between the quantity of calls and the quantity of recordings, or a recording frequency when the mobile terminal makes a call with the target contact within a preset period, as long as it can reflect recording situation of the call between the mobile terminal and the target contact, which is not limited here.

The step 203 is to, when the quantity of calls and the quantity of recordings meet the preset conditions, add information of the target contact to the automatic recording list.

In some embodiments of the present disclosure, when the quantity of calls and the quantity of recordings in the historical calls between the mobile terminal and the target contact are determined to meet preset conditions in the above step 202, the mobile terminal can add the information of the target contact to the automatic recording list which is created in advance. The above information of the target contact may include a phone number of the target contact and a contact name, etc. Information of at least one contact is added to the above automatic recording list.

Optionally, the above step S203 may include: when the quantity of calls and the quantity of recordings meet the preset conditions, displaying prompt information for the mobile terminal user to determine whether to activate automatic recording; detecting whether the mobile terminal user inputs a confirmation operation based on the prompt information; when the mobile terminal user inputs the confirmation operation based on the prompt information, adding the information of the target contact to the automatic recording list. This can prevent the mobile terminal from accidentally adding information of contacts to the automatic recording list.

Optionally, after the above step of adding the information of the target contact to the automatic recording list when the quantity of calls and the quantity of recordings meet the preset conditions, the method may further include: detecting whether a quantity of contacts with added information in the automatic recording list reaches a fifth preset threshold; when the quantity of contacts with added information in the automatic recording list reaches the fifth preset threshold, displaying a reminding message; and adding information of contacts selected by the mobile terminal user based on the reminding message to the automatic recording list.

For example, the fifth preset threshold is set in advance to be 10; when the quantity of contacts with added information in the automatic recording list exceeds 10, it indicates that the mobile terminal user uses the call recording of the mobile terminal at a higher frequency, and the mobile terminal displays a reminding message to remind the mobile terminal user to manually select contacts whose information is needed to be added to the automatic recording list. The mobile terminal can add the information of the contacts selected by the mobile terminal user based on the reminding message to the automatic recording list. In this way, when the mobile terminal is in calls, the mobile terminal can automatically activate the call recording for more contacts, thereby further enabling the operation of the mobile terminal to be more convenient and time-saving.

The step 204 is to, when the mobile terminal is in a call with one contact, obtain information of the contact in the current call with the mobile terminal.

In some embodiments of the present disclosure, when the mobile terminal establishes a call in response to a call request or is in a conversation with the contact, the mobile terminal can obtain the information of the contact in the current call with the mobile terminal. The above information of the contact may include a contact name and a phone number of the contact, etc. Of course, the above contact does not refer to a real "person", but refers to a terminal that can make a call with the mobile terminal, which may be a mobile terminal or a fixed telephone device.

The step 205 is to determine whether the information of the contact in the current call is found in the automatic recording list preset in the mobile terminal.

In some embodiments of the present disclosure, when the information of the contact in the current call is obtained, the mobile terminal may search the preset automatic recording list according to the information of the contact in the current call, and determine whether the information of the contact in the current call is found in the automatic recording list. Information of at least one contact is added to the preset automatic recording list.

The step 206 is to activate call recording when the information of the contact in the current call is found in the automatic recording list in the mobile terminal.

In some embodiments of the present disclosure, in the above step 205, when the information of the contact in the current call is found in the automatic recording list in the mobile terminal, it indicates that when the mobile terminal makes a call with the contact, it needs to record the call process. Then, the mobile terminal automatically turns on a recording module and records the call of the contact in the current call.

Optionally, after the above step of activating the call recording when the information of the contact in the current call is found in the automatic recording list in the mobile terminal, the method may further include: when the mobile terminal is in a call state with the contact and the call recording is detected to be off, clearing the information of the contact in the current call in the automatic recording list. This can save storage space for the mobile terminal.

Figure 3:
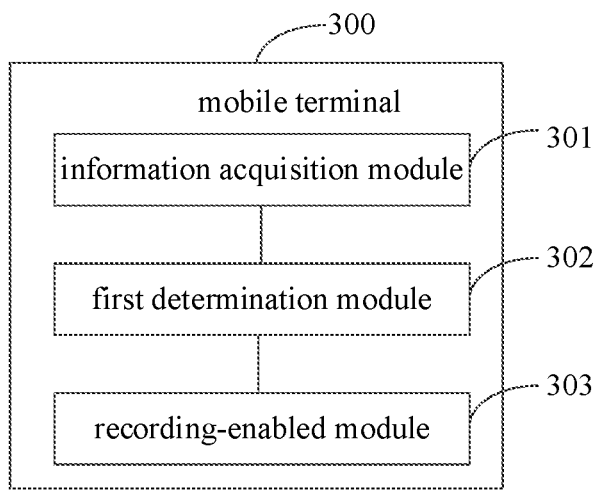
FIG. 3 is a block diagram of a mobile terminal according to an embodiment of the present disclosure.

In this way, in some embodiments of the present disclosure, by recording the quantity of calls and the quantity of recordings in the historical calls between the mobile terminal and the target contact, determining whether the quantity of calls and the quantity of recordings meet preset conditions, and then adding information of the target contact to the automatic recording list when the quantity of calls and the quantity of recordings meet the preset conditions, the mobile terminal activates the call recording when the mobile terminal is in a call with one contact and the information of the contact in the current call can be found in the automatic recording list. In this way, based on the quantity of calls and the quantity of recordings in the historical calls between the mobile terminal and the target contact, the mobile terminal can automatically activate the call recording, which is convenient and time-saving. FIG. 3 is a block diagram of a mobile terminal according to an embodiment of the present disclosure. The mobile terminal shown in FIG. 3 can implement details of the recording method for mobile terminals shown in FIG. 1 and FIG. 2, and achieve the same effect. The mobile terminal 300 includes an information acquisition module 301, a first determination module 302 and a recording-enabled module 303.

The information acquisition module 301 is configured to, when the mobile terminal is in a call with a contact, obtain information of the contact in the current call with the mobile terminal.

The first determination module 302 is configured to, determine whether the information of the contact in the current call is found in an automatic recording list preset in the mobile terminal.

The recording-enabled module 303 is configured to, activate call recording when the information of the contact in the current call is found in the automatic recording list in the mobile terminal.

Figure 4:
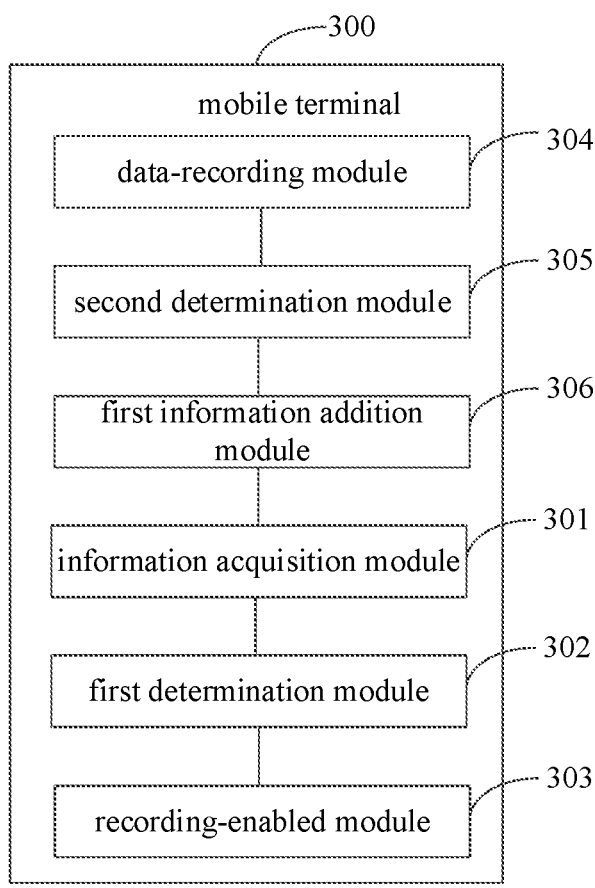
FIG. 4 is a block diagram of another mobile terminal according to an embodiment of the present disclosure.

Optionally, as shown in FIG. 4, the mobile terminal 300 may further include: a data-recording module 304 configured to record a quantity of calls and a quantity of recordings in historical calls between the mobile terminal and a target contact; a second determination module 305 configured to determine whether the quantity of calls and the quantity of recordings meet preset conditions; and, a first information addition module 306 configured to, when the quantity of calls and the quantity of recordings meet the preset conditions, add information of the target contact to the automatic recording list.

Optionally, the second determination module 305 is further configured to, when the quantity of calls reaches a first preset threshold, determine whether the quantity of recordings is greater than or equal to a second preset threshold; when the quantity of recordings is greater than or equal to the second preset threshold, determine that the quantity of calls and the quantity of recordings meet preset conditions.

Optionally, the second determination module 305 is further configured to, when the quantity of calls reaches a third preset threshold, determine whether a ratio of the quantity of recordings to the quantity of calls is greater than or equal to a fourth preset threshold, and determine that the quantity of calls and the quantity of recordings meet the preset conditions when the ratio of the quantity of recordings to the quantity of calls is greater than or equal to the fourth preset threshold.

Figure 5:
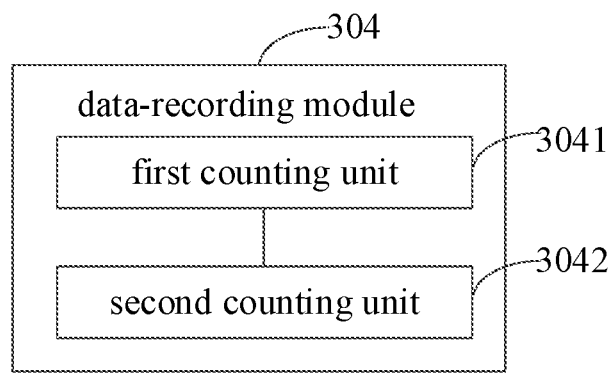
FIG. 5 is a block diagram of a data-recording module in a mobile terminal according to an embodiment of the present disclosure.

Optionally, as shown in FIG. 5, the data-recording module 304 may include:
a first counting unit 3041 configured to, when it is detected that the mobile terminal makes a call with the target contact and the mobile terminal is set to activate the call recording during a call, increase each of an existing quantity of calls and an existing quantity of recordings for the target contact in the mobile terminal by one; and
a second counting unit 3042 configured to, when it is detected that the mobile terminal makes a call with the target contact and the mobile terminal is set to not activate the call recording during a call and an existing quantity of recordings is greater than zero, increase an existing quantity of calls for the target contact in the mobile terminal by one.

Figure 6:
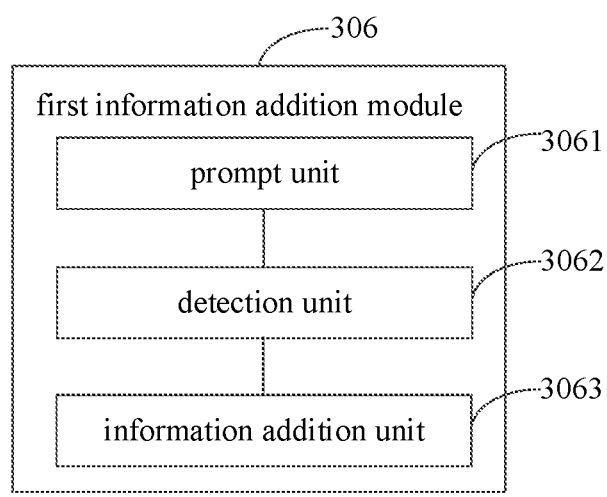
FIG. 6 is a block diagram of a first information addition module in a mobile terminal according to an embodiment of the present disclosure.

Optionally, as shown in FIG. 6, the first information addition module 306 may include:
a prompt unit 3061 configured to, when the quantity of calls and the quantity of recordings meet the preset conditions, display prompt information for the mobile terminal user to determine whether to activate automatic recording;
a detection unit 3062 configured to detect whether the mobile terminal user inputs a confirmation operation based on the prompt information;
an information addition unit 3063 configured to, when the mobile terminal user inputs the confirmation operation based on the prompt information, add the information of the target contact to the automatic recording list.

Figure 7:
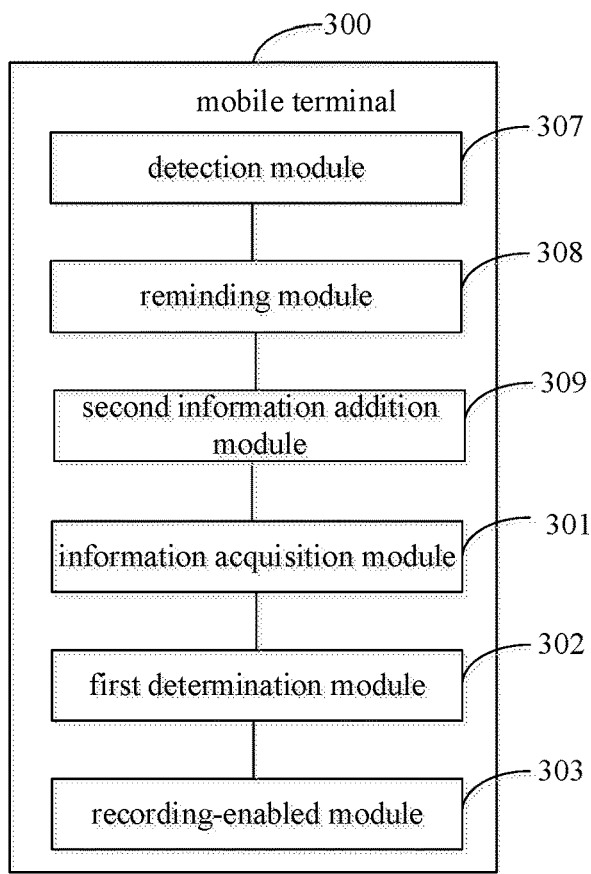
FIG. 7 is a block diagram of another mobile terminal according to an embodiment of the present disclosure.

Optionally, as shown in FIG. 7, the mobile terminal 300 may further include:
a detection module 307 configured to detect whether a quantity of contacts with added information in the automatic recording list reaches a fifth preset threshold;
a reminding module 308 configured to, when the quantity of contacts with added information in the automatic recording list reaches the fifth preset threshold, display a reminding message; and
a second information addition module 309 configured to add information of contacts selected by the mobile terminal user based on the reminding message to the automatic recording list.

In this way, according to the mobile terminal 300 in some embodiments of the present disclosure, when the mobile terminal makes a call with the contact, the mobile terminal can obtain the information of the contact in the current call with the mobile terminal, and then determine whether the information of the contact in the current call is found in the automatic recording list preset in the mobile terminal. The mobile terminal activates the call recording when the information of the contact in the current call is found in the automatic recording list in the mobile terminal. In this way, when the mobile terminal makes a call with the contact in the preset automatic recording list, the mobile terminal can automatically activate the call recording, which is convenient and time-saving.

Figure 8:
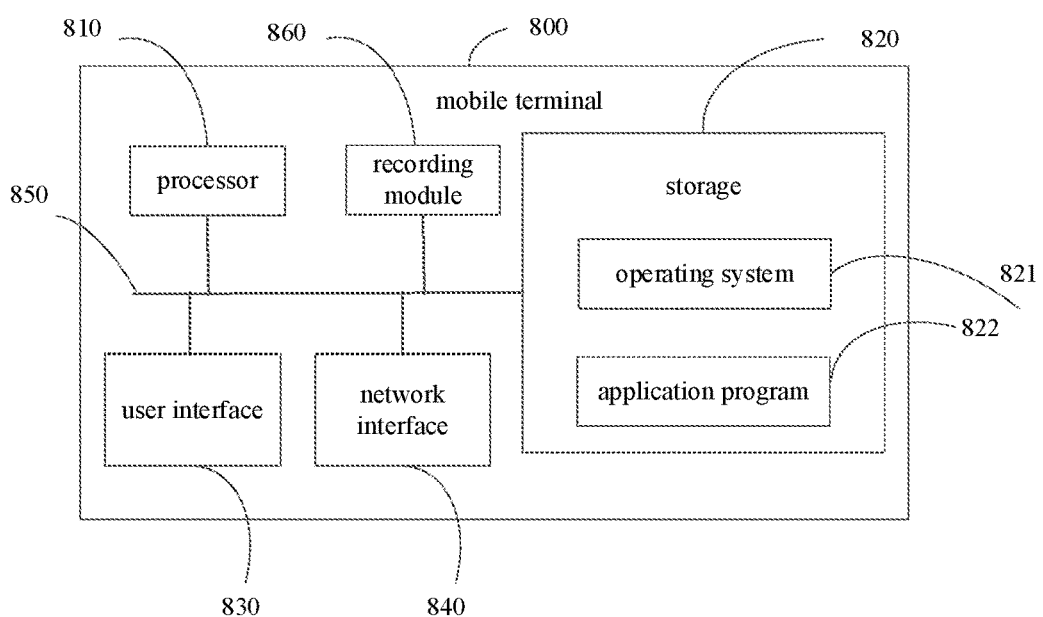
FIG. 8 is a block diagram of another mobile terminal according to an embodiment of the present disclosure.

FIG. 8 is a block diagram of another mobile terminal according to an embodiment of the present disclosure. The mobile terminal shown in FIG. 8 can implement details of the recording method for mobile terminals shown in FIG. 1 and FIG. 2, and achieve the same effect. As shown in FIG. 8, the mobile terminal 800 includes at least one processor 810, a storage 820, at least one user interface 830 and a network interface 840. Various components in the mobile terminal 800 may be coupled together via a bus system 850. It can be understood that the bus system 850 is used to implement communication between these components. The bus system 850 may include a power bus, a control bus and a status signal bus in addition to a data bus. For clarity of description, various buses are labeled as the bus system 850 in FIG. 8. The mobile terminal 800 may further include a recording module 860. The recording module 860 may be coupled with various components of the mobile terminal via the bus system 850.

The user interface 830 may include a display device, a keyboard or a click device such as a mouse, a trackball, a touch board or a touch screen.

It can be understood that the storage 820 in some embodiments of the present disclosure may be a volatile storage or a nonvolatile storage, or include both the volatile and non-volatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRS-DRAM), Enhanced SDRAM (ESDRAM), Synch Link DRAM (SLDRAM) and Direct Rambus RAM (DRRAM). The storage 820 of the system and method described in the present disclosure is intended to include, but is not limited to, these and any other suitable types of storages.

In some embodiments, the storage 820 stores following elements, such as executable modules, data structure, subset thereof, or superset thereof: an operating system 821 and an application program 822.

The operating system 821 includes various kinds of system programs, such as a framework layer, a core library layer and a driver layer, which are used to implement various kinds of basic services and process hardware-based tasks. The application program 822 includes various kinds of application programs, such as Media Player and Browser, which are used to implement various kinds of application services. Programs, which are used to implement methods in embodiments of the present disclosure, may be included in the program application 822.

In some embodiments of the present disclosure, programs or instructions stored in the storage 820 are called, specifically, the programs or instructions stored in the application program 822 are called. The processor 810 is configured to obtain information of the contact in the current call with the mobile terminal when the mobile terminal is in a call with the contact; determine whether the information of the contact in the current call is found in an automatic recording list preset in the mobile terminal; and activate call recording when the information of the contact in the current call is found in the automatic recording list in the mobile terminal.

The above methods disclosed in some embodiments of the present disclosure may be applied to the processor 810 or implemented by the processor 810. The processor 810 may be an integrated circuit chip with signal processing capability. In the implementation process, various steps of the foregoing method may be completed by using an integrated logic circuit of hardware in the processor 810 or an instruction in a software form. The above processor 810 may be a general-purpose processor, a digital signal processor (DSP), an application specific integrated circuit (ASIC), a field programmable gate array (FPGA), a programmable logic device, discrete gate or transistor logic device, discrete hardware components, which can implement or execute various methods, steps, and logic block diagrams disclosed in the embodiments of the present disclosure. The general-purpose processor may be a microprocessor or any typical processor or the like. The steps of the method disclosed in the embodiments of the present disclosure may be directly implemented by a hardware decoding processor, or may be performed by a combination of hardware and software modules in the decoding processor. The software module may be located in a mature storage medium in the field such as a random storage medium, a flash memory, a read only memory, a programmable read only memory, an electrically erasable programmable memory, and a register. The storage medium is located in the storage 820, and the processor 810 reads information in the storage 820, and completes the steps of the foregoing method in combination with the hardware thereof.

It will be appreciated that the embodiments described herein may be implemented in hardware, software, firmware, middleware, microcode, or a combination thereof. For hardware implementation, a processor unit may be implemented in one or more Application Specific Integrated Circuits (ASICs), Digital Signal Processing (DSP), Digital Signal Processing Equipment (DSPD), programmable Logic Device (PLD), Field-Programmable Gate Array (FPGA), general-purpose processor, controller, microcontroller, microprocessor, other electronic unit for performing the functions of the present application or a combination thereof.

For software implementations, the techniques herein may be implemented by modules (such as procedures, functions) that perform the functions herein. The software codes may be stored in the storage and executed by the processor. The storage may be implemented in the processor or external to the processor.

Optionally, before performing the above step of obtaining the information of the contact in the current call with the mobile terminal when the mobile terminal is in a call with the contact, the processor 810 is further configured to, record a quantity of calls and a quantity of recordings in historical calls between the mobile terminal and a target contact;

determine whether the quantity of calls and the quantity of recordings meet preset conditions; and add information of the target contact to the automatic recording list when the quantity of calls and the quantity of recordings meet the preset conditions.

Optionally, the above step of determining whether the quantity of calls and the quantity of recordings meet the preset conditions implemented by the processor 810, includes: when the quantity of calls reaches a first preset threshold, determining whether the quantity of recordings is greater than or equal to a second preset threshold; when the quantity of recordings is greater than or equal to the second preset threshold, determining that the quantity of calls and the quantity of recordings meet the preset conditions.

Optionally, the above step of determining whether the quantity of calls and the quantity of recordings meet the preset conditions implemented by the processor 810, includes: when the quantity of calls reaches a third preset threshold, determining whether a ratio of the quantity of recordings to the quantity of calls is greater than or equal to a fourth preset threshold, and determining that the quantity of calls and the quantity of recordings meet the preset conditions when the ratio of the quantity of recordings to the quantity of calls is greater than or equal to the fourth preset threshold.

Optionally, the above step of recording the quantity of calls and the quantity of recordings in the historical calls between the mobile terminal and the target contact implemented by the processor 810, includes: when it is detected that the mobile terminal makes a call with the target contact and the mobile terminal is set to activate the call recording during a call, increasing each of an existing quantity of calls and an existing quantity of recordings for the target contact in the mobile terminal by one.

Optionally, the above step of adding information of the target contact to the automatic recording list when the quantity of calls and the quantity of recordings meet the preset conditions implemented by the processor 810, includes:

when the quantity of calls and the quantity of recordings meet the preset conditions, displaying prompt information for the mobile terminal user to determine whether to activate automatic recording;

detecting whether the mobile terminal user inputs a confirmation operation based on the prompt information;

when the mobile terminal user inputs the confirmation operation based on the prompt information, adding the information of the target contact to the automatic recording list.

Optionally, after the above step of adding information of the target contact to the automatic recording list when the quantity of calls and the quantity of recordings meet the preset conditions implemented by the processor 810, the processor 810 is further configured to, detect whether a quantity of contacts with added information in the automatic recording list reaches a fifth preset threshold;

when the quantity of contacts with added information in the automatic recording list reaches the fifth preset threshold, display a reminding message; and add information of contacts selected by the mobile terminal user based on the reminding message to the automatic recording list.

The mobile terminal 800 can implement various processes implemented by the mobile terminal in some embodiments of the present disclosure, which will not be elaborated herein to avoid repetition.

According to the mobile terminal 800 in some embodiments of the present disclosure, when the mobile terminal makes a call with the contact, the mobile terminal can obtain the information of the contact in the current call with the mobile terminal, and then determine whether the information of the contact in the current call is found in the automatic recording list preset in the mobile terminal. The mobile terminal activates the call recording when the information of the contact in the current call is found in the automatic recording list in the mobile terminal. In this way, when the mobile terminal makes a call with the contact in the preset automatic recording list, the mobile terminal can automatically activate the call recording, which is convenient and time-saving.

Those skilled in the art of the present disclosure may be conscious of that units and algorithm steps in each example described in embodiments of the present disclosure may be implemented via electronic hardware or the combination of the computer software and electronic hardware. Whether these functions are executed by the hardware or software depends on specific application and design constraints of the technical scheme. Professionals apply different methods to each specific application to implement the described functions, but this implementation should not be considered beyond the scope of the present disclosure.

Those skilled in the art can clearly understand that, for the convenience and simplicity of description, the specific working process of the systems, mobile terminals and units described above can refer to the corresponding processes in the embodiments, and will not be repeated here.

In some embodiments provided in the present disclosure, it should be noted that the disclosed mobile terminals and methods may be implemented via other modes. The mobile terminal embodiments described above are only schematic. For example, the division of the units is only the division of the logic function. In actual implementation, additional division mode may exist, such as multiple units or components may be combined, integrated into another system, or some characteristics may be omitted or not executed. In addition, mutual coupling, direct coupling or communication connection among each displayed or discussed elements may be implemented via indirect coupling or communication connection between some interfaces, mobile terminals or units, such as electrical, mechanical, or otherwise.

The units described above as separation units may or may not be physically separated, and the components displayed as the units may or may not be the physical units. The units may be located in one place or distributed to multiple network units. Some or all of the units may be selected according to actual needs to realize the purpose of the embodiments.

In addition, each functional unit in each embodiment of the present disclosure may be integrated into one processing unit, or each unit can be physically and separately used as a unit, or two or more units can be integrated into one unit.

When the functions are implemented in the form of software functional modules and are sold and used as independent products, the functions can be stored in a computer-readable storage medium. On the basis of such an understanding, the technical scheme in essence or those contributing to the existing technology in embodiments of the present disclosure can be embodied in the form of software products. The computer software product is stored in a storage medium, including several instructions to enable a computer device (which may be a personal computer, a server, or a network-side device, etc.) to perform all or partial of the method in each embodiment of the present disclosure. The aforementioned storage medium includes various kinds of mediums which may store the program codes, such as, a U disk, a mobile hardware, a Read-Only Memory (ROM), Random Access Memory (RAM), a disk or disc.

The foregoing only describes preferred embodiments of the present disclosure, but the protection scope of the present disclosure is not limited to this. To those skilled in the art, several modifications and enhancements can be made without departing from the principle of the present disclosure. These modifications and enhancements should be covered by the protection scope of the present disclosure. Therefore, the protection scope of the present disclosure should be defined by the scope of the claims.

What is claimed is:

1. A recording method for a mobile terminal, comprising:
   when the mobile terminal is in a call with a contact, obtaining information of the contact in the current call with the mobile terminal;
   determining whether the information of the contact in the current call is found in an automatic recording list preset in the mobile terminal; and
   activating call recording when the information of the contact in the current call is found in the automatic recording list in the mobile terminal;
   wherein before the step of obtaining the information of the contact in the current call with the mobile terminal when the mobile terminal is in a call with the contact, the method further comprises:
   recording a quantity of calls and a quantity of recordings in historical calls between the mobile terminal and a target contact;
   determining whether the quantity of calls and the quantity of recordings meet preset conditions; and
   when the quantity of calls and the quantity of recordings meet the preset conditions, adding information of the target contact to the automatic recording list.

2. The method of claim 1, wherein the step of determining whether the quantity of calls and the quantity of recordings meet the preset conditions, comprises:
   when the quantity of calls reaches a first preset threshold, determining whether the quantity of recordings is greater than or equal to a second preset threshold; when the quantity of recordings is greater than or equal to the second preset threshold, determining that the quantity of calls and the quantity of recordings meet the preset conditions.

3. The method of claim 1, wherein the step of determining whether the quantity of calls and the quantity of recordings meet the preset conditions, comprises:
   when the quantity of calls reaches a third preset threshold, determining whether a ratio of the quantity of recordings to the quantity of calls is greater than or equal to a fourth preset threshold; when the ratio of the quantity of recordings to the quantity of calls is greater than or equal to the fourth preset threshold, determining that the quantity of calls and the quantity of recordings meet the preset conditions when the ratio of the quantity of recordings to the quantity of calls is greater than or equal to the fourth preset threshold.

4. The method of claim 1, wherein the step of recording the quantity of calls and the quantity of recordings in the historical calls between the mobile terminal and the target contact, comprises:
   when it is detected that the mobile terminal makes a call with the target contact and the mobile terminal is set to activate the call recording during a call, increasing each of an existing quantity of calls and an existing quantity of recordings for the target contact in the mobile terminal by one; and
   when it is detected that the mobile terminal makes a call with the target contact and the mobile terminal is set to not activate the call recording during a call and the existing quantity of recordings is greater than zero, increasing the existing quantity of calls for the target contact in the mobile terminal by one.

5. The method of claim 1, wherein the step of when the quantity of calls and the quantity of recordings meet the preset conditions, adding information of the target contact to the automatic recording list, comprises:
   when the quantity of calls and the quantity of recordings meet the preset conditions, displaying prompt information for a mobile terminal user to determine whether to activate automatic recording;
   detecting whether the mobile terminal user inputs a confirmation operation based on the prompt information; and
   when the mobile terminal user inputs the confirmation operation based on the prompt information, adding the information of the target contact to the automatic recording list.

6. The method of claim 1, wherein after the step of adding the information of the target contact to the automatic recording list when the quantity of calls and the quantity of recordings meet the preset conditions, the method further comprises:
   detecting whether a quantity of contacts with added information in the automatic recording list reaches a fifth preset threshold;
   when the quantity of contacts with added information in the automatic recording list reaches the fifth preset threshold, displaying a reminding message; and
   adding information of contacts selected by the mobile terminal user based on the reminding message to the automatic recording list.

7. A mobile terminal, comprising:
   an information acquisition module configured to, when the mobile terminal is in a call with a contact, obtain information of the contact in the current call with the mobile terminal;
   a first determination module configured to, determine whether the information of the contact in the current call is found in an automatic recording list preset in the mobile terminal; and
   a recording-enabled module configured to activate call recording when the information of the contact in the current call is found in the automatic recording list in the mobile terminal;
   wherein the mobile terminal further includes:
   a data-recording module configured to record a quantity of calls and a quantity of recordings in historical calls between the mobile terminal and a target contact;
   a second determination module configured to determine whether the quantity of calls and the quantity of recordings meet preset conditions; and,
   a first information addition module configured to, when the quantity of calls and the quantity of recordings meet the preset conditions, add information of the target contact to the automatic recording list.

8. The mobile terminal of claim 7, wherein the second determination module is further configured to, when the quantity of calls reaches a first preset threshold, determine whether the quantity of recordings is greater than or equal to a second preset threshold; when the quantity of recordings is greater than or equal to the second preset threshold, determine that the quantity of calls and the quantity of recordings meet preset conditions.

9. The mobile terminal of claim 7, wherein the second determination module is further configured to, when the quantity of calls reaches a third preset threshold, determine whether a ratio of the quantity of recordings to the quantity of calls is greater than or equal to a fourth preset threshold; when the ratio of the quantity of recordings to the quantity of calls is greater than or equal to the fourth preset threshold, determine that the quantity of calls and the quantity of recordings meet the preset conditions.

10. The mobile terminal of claim 7, wherein the data-recording module comprises:
   a first counting unit configured to, when it is detected that the mobile terminal makes a call with the target contact and the mobile terminal is set to activate the call recording during a call, increase each of an existing quantity of calls and an existing quantity of recordings for the target contact in the mobile terminal by one; and
   a second counting unit configured to, when it is detected that the mobile terminal makes a call with the target contact and the mobile terminal is set to not activate the call recording during a call and the existing quantity of recordings is greater than zero, increase the existing quantity of calls for the target contact in the mobile terminal by one.

11. The mobile terminal of claim 7, wherein the first information addition module comprises:
   a prompt unit configured to, when the quantity of calls and the quantity of recordings meet the preset conditions, display prompt information for a mobile terminal user to determine whether to activate automatic recording;
   a detection unit configured to detect whether the mobile terminal user inputs a confirmation operation based on the prompt information;
   an information addition unit configured to, when the mobile terminal user inputs the confirmation operation based on the prompt information, add the information of the target contact to the automatic recording list.

12. The mobile terminal of claim 7, further comprising:
   a detection module configured to detect whether a quantity of contacts with added information in the automatic recording list reaches a fifth preset threshold;
   a reminding module configured to, when the quantity of contacts with added information in the automatic recording list reaches the fifth preset threshold, display a reminding message; and
   a second information addition module configured to add information of contacts selected by the mobile terminal user based on the reminding message to the automatic recording list.

13. A mobile terminal, comprising: a storage, a processor and a computer program stored in the storage and executable on the processor; wherein the processor executes the computer program to implement steps of the method of claim 1.

* * * * *